United States Patent
Tornel Garcia

(10) Patent No.: US 9,005,351 B2
(45) Date of Patent: Apr. 14, 2015

(54) DESICCANT TABLET ENCAPSULATED IN A SPECIAL CLOTH

(76) Inventor: Jose Tornel Garcia, Murcia (ES)

( * ) Notice: Subject to any disclaimer, the term of this patent is extended or adjusted under 35 U.S.C. 154(b) by 0 days.

(21) Appl. No.: 14/234,942

(22) PCT Filed: Jul. 20, 2012

(86) PCT No.: PCT/ES2012/070558
§ 371 (c)(1),
(2), (4) Date: Mar. 25, 2014

(87) PCT Pub. No.: WO2013/014315
PCT Pub. Date: Jan. 31, 2013

(65) Prior Publication Data
US 2014/0338538 A1    Nov. 20, 2014

(30) Foreign Application Priority Data
Jul. 25, 2011   (ES) .................................. 201131269

(51) Int. Cl.
| | | |
|---|---|---|
| *B01D 53/02* | (2006.01) | |
| *B01D 53/26* | (2006.01) | |
| *B01D 53/04* | (2006.01) | |
| *B29C 65/00* | (2006.01) | |

(52) U.S. Cl.
CPC .......... *B01D 53/261* (2013.01); *B01D 53/0407* (2013.01); *B01D 2251/404* (2013.01); *B01D 2253/112* (2013.01); *B29C 65/00* (2013.01)

(58) Field of Classification Search
CPC ................... B01D 2251/404; B01D 2253/112; B01D 53/0407; B01D 53/261; B29C 65/00
See application file for complete search history.

(56) References Cited

U.S. PATENT DOCUMENTS

| | | | |
|---|---|---|---|
| 5,906,879 A * | 5/1999 | Huntoon et al. ............. | 428/136 |
| 6,540,937 B1 | 4/2003 | Payne | |
| 6,767,521 B1 | 7/2004 | Vogt | |
| 2005/0056151 A1* | 3/2005 | Hurley et al. .................. | 96/108 |
| 2007/0128434 A1* | 6/2007 | Motoda et al. ................ | 428/375 |
| 2010/0239625 A1* | 9/2010 | Puckett et al. ................ | 424/402 |

FOREIGN PATENT DOCUMENTS

| | | |
|---|---|---|
| ES | 2 041 485 T3 | 11/1993 |
| ES | 1 076 034 | 1/2012 |

* cited by examiner

*Primary Examiner* — Christopher P Jones
(74) *Attorney, Agent, or Firm* — Lucas & Mercanti, LLP

(57) ABSTRACT

The invention relates to a system of encapsulating a hygroscopic salt tablet of the type used to absorb moisture in closed environments. Said encapsulation consists of seamless cloth, usually "non-woven", arranged so that it includes folds that minimize the air chamber between the tablet and the covering thereof. Said arrangement allows the tablet to work more effectively than other similar ones by eliminating the resistance that the air causes to the absorption of moisture. Said tablet begins to work when the ambient moisture is greater than 55%-60% and is used inside a plastic device that has slots to absorb the moist air and has a bottom container for deposit of a brine resulting from the process of absorbing moisture.

4 Claims, 2 Drawing Sheets

DESICCANT TABLET ENCAPSULATED IN A SPECIAL CLOTH

CROSS-REFERENCE TO RELATED APPLICATIONS

This application is a 371 of PCT/ES2012/070558 filed Jul. 20, 2012, which in turn claims the priority of ES P201131269 filed Jul. 25, 2011, the priority of both applications is hereby claimed and both applications are incorporated by reference herein.

TECHNICAL FIELD

The present invention relates to a desiccant tablet encapsulated in a special cloth, of the kind usually referred to as non-woven, and to the process by which it is encapsulated in the non-woven material. The purpose of the tablet is to absorb moisture in enclosed spaces. The method for encapsulating it in the pleated, non-woven fabric improves the tablet's performance.

BACKGROUND ART

The desiccant tablet is one of the products in a wide range of products that absorb moisture from the air. The main characteristic of this type of tablet's operation is that it absorbs moisture in layers, i.e. real-time operation, since, in conditions where relative humidity is higher that 55-60%, the first layer of the product is used up, thus releasing a brine into its bottom container; and, conversely, if humidity is lower than 55-60%, the desiccant tablet will not operate, and ceases to release brine, so the presence or absence at moisture in the air can be detected thereby in real time.

Said desiccant tablet is based on calcium chloride, a hygroscopic and deliquescent salt with the ability to absorb ambient moisture. To these aromatic substances may also be added to combine a desiccant function with an air-freshening function as described in patent ES2353556. However, these desiccant active compounds are labeled with the pictogram Xi (irritant) and risk phrase R36 (irritating to eyes), as well as the safety phrases S22 (do not breathe dust) and S24 (avoid contact with skin). In order to avoid contact with the skin, various packaging and encapsulation systems have been used. Among these, one of the most novel is the use of a special type of non-woven textile material, hereinafter referred to as non-woven. This type of cloth is used due to the fact that it is an engineered product whose properties can be artificially designed. Specifically, it can be a material with a very long life or a short one; its functions can include absorption, liquid repellence, resilience, elasticity, plasticity, or durability; such cloths can also be fire-proof, washable, can be used as a stuffing material, as a bacterial barrier for filtering compounds, or for their sterility.

U.S. Pat. No. 2,649,923 describes a bag made from non-woven that hangs in order to facilitate the ventilation of a moisture-absorbing compound, which has the disadvantage of operating more slowly, given that it is normally used in small spaces such as closets, shoe racks, etc., where ventilation is low.

Patent EP0686422 has the same disadvantages as mentioned above. A bag that contains two layers of a material that should be permeable to moisture-laden air is disclosed, while at the same time impermeable to the aqueous solution that is generated inside the bag, wherein the active substance with a desiccant reaction is preferably calcium chlorate. The brine that results from the reaction is kept inside the bag itself by means of an absorbent material.

Patent US2008/0206459 protects an invention relating to a non-woven moisture-absorbing material that can be recycled after it has been used. However, it is a complex fabric, made up of three different layers, which are meant for applications in which it is not necessary to absorb a large amount of moisture since the maximum index is 65% of its weight after 5 hours exposed to conditions of high relative humidity, thus reducing its absorption capacity to 18-36% by weight once the damp material has been recycled under drying conditions of 120° C.

Patent FR2750618 addresses some of the problems mentioned above because it is a device comprising two chambers, wherein the upper portion contains the water-absorbing hygroscopic active compound, which pours the brine into the lower chamber. This solution, which is adequate for addressing the problem of reducing air moisture, is not optimal because there is a layer of air between the top portion of the hygroscopic material and the non-woven fabric that encapsulates it. This material is made of polyolefin or a cellulosic fabric, but it does not fit snugly against the active substance, giving rise to an inner layer of air with low relative humidity that makes it harder for the hygroscopic active substance to begin operating, and once it is in operational mode, this layer of dry air generates resistance to the transmission of moisture from the external air into the non-woven fabric. The same disadvantages arising from a chamber of dry air between the encapsulation and the tablet are found in patent US2010/0025629, which describes a desiccant tablet encapsulated in a material that is permeable to water vapor, preferably embodied in polyethylene, polytetrafluoroethylene, polyvinylpyrrolidone, or cellulose ether. In addition, this patent describes desiccant tablets that absorb up to 40% of their weight in water, which quantity is far lower than that which will be described in the object of the present invention.

DESCRIPTION OF THE INVENTION

The present invention refers to a desiccant tablet encapsulated with a pleated non-woven fabric. As opposed to the widespread use of small pouches made of non-woven fabric, the use of a pleated or soap-style casing gives the non-woven material a much snugger fit around the tablet. The pleating consists of making small folds of even width in the cloth that encapsulates the desiccant tablet.

The fact that the non-woven material fits snugly around the tablet offers significant advantages during manufacturing. The industrial packaging process is simpler, since it is no longer necessary to seal both of the corners formed by the non-woven fabric and the plastic film wrapper in which the product is sold. This film is the packaging that makes it possible to handle the product while keeping the moisture absorption process from starting during storage, transportation and sale. Furthermore, this process is more efficient, since it requires less non-woven material to be consumed (30% less), in addition to consuming less transparent film for packaging.

Another advantage to using pleating is that it significantly improves the performance of the desiccant tablet. The pleated or soap-style non-woven fabric, by fitting snugly around the desiccant tablet, allows the product to begin operating much more quickly. The desiccant tablet begins to operate as though there were no barrier at all around the product, unlike the non-woven fabric in pouch form, which, because it does not fit snugly, leaves a layer of air between the tablet and the non-woven fabric, creating resistance to the tablet's absorption of moisture. Lastly, and as a result of the foregoing, the desiccant tablet is used up faster in the present ease of pleated or soap-style non-woven fabric than in the ease of non-woven fabric in pouch form.

The process for manufacturing the non-woven that is placed in pleated form around the tablet is carried out using machines designed to make the folds. The characteristics of the non-woven material used in this type of process are different than the non-woven materials used to encapsulate the tablet in pouch form. Bicomponent non-woven material is needed, i.e. material wherein the binder is not another layer in addition to the material but rather is part of the compound itself, such that the material can be sealed more uniformly and efficiently.

It should be borne in mind that the pleating process involves sealing many layers together, some on the front side and others on the backside. For this type of sealing, it is not possible to use monocomponent non-woven materials wherein the binder is an additional layer of powder on just one face of the material.

PREFERRED EMBODIMENT

Figure 1:
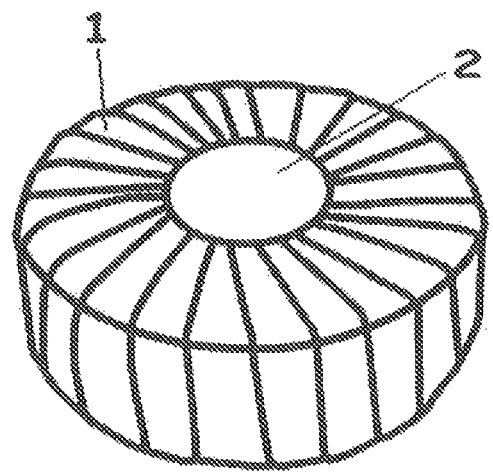
FIG. 1 shows a complete view of the desiccant tablet with the pleated non-woven fabric, wherein the folds (1) of the non-woven material and how the non-woven material fits snuggly around the tablet, delineating its entire shape can be observed. At the top of the tablet, a space (2) without pleating, which is the area where all the corners of the non-woven are sealed can be observed.
Figure 2:
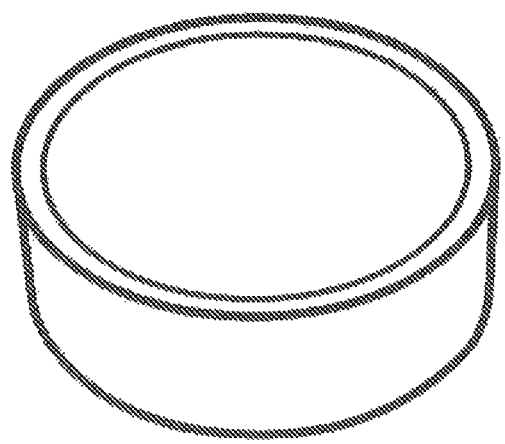
FIG. 2 shows a complete view of the desiccant tablet without non-woven material, of the sort that is part of the background art.
Figure 3:
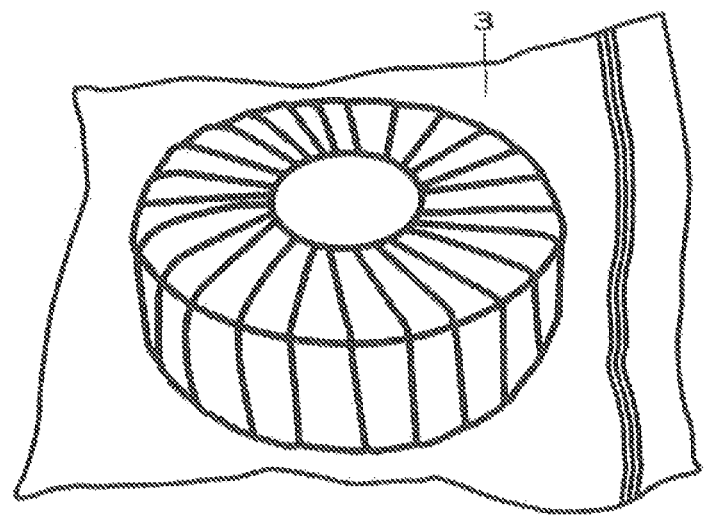
FIG. 3 shows a complete view of the desiccant tablet with the pleated non-woven material and packaged in transparent film (3), which is what keeps the tablet from beginning to operate until said film is removed.
Figure 4:
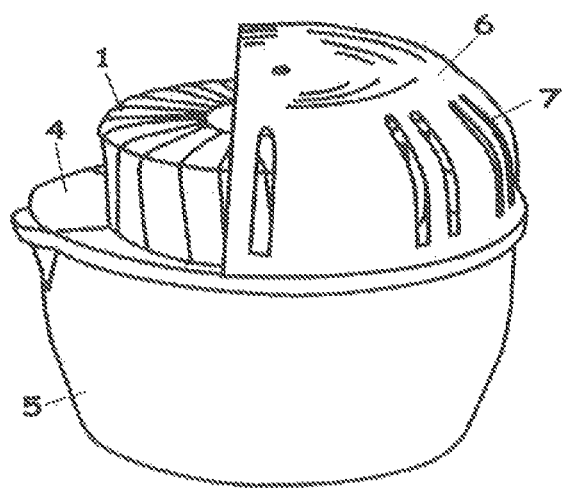
FIG. 4 shows the desiccant device where the desiccant tablet is placed when operational. One can see a divider (4) that holds the tablet and divides the top portion of the container from the bottom container (5), which collects the brine generated during the moisture absorption process. One can also see a cross-section of the upper grating (6), which keeps the product from being touched, as well as the fact that it has slots (7) which allow moisture to pass through so that it can be absorbed.

The desiccant tablet encapsulated in non-woven fabric is put to use inside a plastic device especially designed to capture moisture. Its top portion has a grating (6) with large-sized slots (7), which enable moist air to flow through them. In the middle of this plastic device, there is a flat divider (4), which has slots through which the brine falls into the bottom container (5), and upon which the moisture-absorbing tablet is placed, and into said bottom portion is where the moisture falls in the form of a saline solution.

The desiccant tablet is made up of crystals, made up mostly of calcium chloride salts, which are hygroscopic and deliquescent, attracting the water vapor in the air and absorbing moisture, thus dissolving into said salts. This tablet absorbs the excess moisture in the air, thereby turning ambient moisture, when above 55-60%, into a saline solution. The saline solution absorbed by the tablet passes through the holes in the divider (4) and settles in the bottom container (5) of the plastic container.

The preferred embodiment consists of a 450 g desiccant tablet. This size is suitable for spaces of 20 $m^2$, such as kitchens, bathrooms, bedrooms, garages, RVs, etc. The tablet will last for varying amounts of time, depending on the percentage of ambient moisture and on the temperature, meaning that it may typically vary between three months in winter and two weeks in summer, in very humid settings. Specifically, this desiccant tablet, when exposed to a temperature of 25° C. and a constant ambient moisture of 70%, lasts for 480 hours.

The tablet is encapsulated in a non-woven fabric that is highly breathable and is pleated to fit snugly around the same without leaving a chamber of air. This creates perfect contact between the moist air and the tablet itself. Encapsulating the tablet is advisable in order to avoid contact with the calcium chloride salts. Furthermore, it holds the impurities generated during the moisture-absorption process inside the non-woven fabric, making the product more hygienic.

The process for encapsulating the desiccant tablet in a pleated, non-woven fabric is similar to the packaging process commonly used in the soap-manufacturing industry. The first step is to place all the tablets on a conveyor belt. The non-woven fabric is cut into an octagonal shape and placed beneath each desiccant tablet on top of a dish-shaped base. Subsequently, the desiccant tablet and the nonwoven encapsulation are pushed through a piston that encapsulates the lower portion of the tablet, after which the upper portion is encapsulated in pleats using a sealing arm that closes the encapsulation.

The invention claimed is:

1. A desiccant tablet encapsulated in a non-woven cloth wherein the encapsulation is pleated in such a way that a chamber of dry air between the tablet and its encapsulation is minimized, allowing the tablet to work more effectively by eliminating the resistance to moisture absorption caused by said chamber of air.

2. The desiccant tablet encapsulated in a cloth according claim 1, wherein the tablet weighs approximately 450 grams, which when exposed to a temperature of 25.degree. C. and a constant ambient moisture of 70% absorbs moisture for 480 hours.

3. An encapsulation process for making the desiccant tablet encapsulated in a non-woven cloth according to claim 1, comprising cutting the cloth into an octagonal shape, placing it beneath the tablet, then pushing the tablet and its encapsulation of pleated cloth downwards, and sealing a top portion using an arm that closes the encapsulation.

4. The encapsulation process according to claim 3, wherein the tablet weighs approximately 450 grams, which when exposed to a temperature of 25.degree. C. and a constant ambient moisture of 70% absorb moisture for 480 hours.

\* \* \* \* \*